US008000603B2

(12) United States Patent
Coffey

(10) Patent No.: US 8,000,603 B2
(45) Date of Patent: *Aug. 16, 2011

(54) WDM SYSTEMS AND METHODS

(75) Inventor: Joseph Coffey, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,458

(22) Filed: Jan. 11, 2010

(65) Prior Publication Data

US 2010/0111535 A1    May 6, 2010

Related U.S. Application Data

(63) Continuation of application No. 10/791,365, filed on Mar. 1, 2004, now Pat. No. 7,646,981.

(51) Int. Cl.
*H04J 14/02* (2006.01)

(52) U.S. Cl. ............... 398/79; 398/67; 398/68; 398/82; 398/164; 385/24

(58) Field of Classification Search ............ 398/48, 398/66–79, 135–139, 164, 115–117; 385/17–24; 361/688
See application file for complete search history.

(56) References Cited

U.S. PATENT DOCUMENTS

| | | | |
|---|---|---|---|
| 5,218,465 A | | 6/1993 | Lebby et al. |
| 5,475,778 A | | 12/1995 | Webb |
| 5,487,120 A | * | 1/1996 | Choy et al. ................ 385/24 |
| 5,490,252 A | | 2/1996 | Macera et al. |
| 6,241,778 B1 | | 6/2001 | de Lind van Wijngaarden et al. |
| 6,502,997 B1 | | 1/2003 | Lee et al. |
| 6,571,030 B1 | | 5/2003 | Ramaswami et al. |
| 6,625,033 B1 | * | 9/2003 | Steinman ................ 361/753 |
| 6,814,546 B2 | | 11/2004 | Sekiguchi |
| 6,915,036 B2 | | 7/2005 | Bhalla et al. |
| 6,944,404 B2 | | 9/2005 | Lange et al. |
| 7,043,532 B1 | | 5/2006 | Humpleman et al. |
| 2002/0024698 A1 | | 2/2002 | Jiang et al. |
| 2002/0072255 A1 | | 6/2002 | Leman |
| 2002/0089996 A1 | * | 7/2002 | Komatsu et al. ............ 370/442 |
| 2003/0039006 A1 | * | 2/2003 | Carbone et al. ............ 359/124 |
| 2003/0169566 A1 | | 9/2003 | Owens et al. |

(Continued)

FOREIGN PATENT DOCUMENTS

EP     0 650 082 A1    4/1995

(Continued)

OTHER PUBLICATIONS

"CWDM Managed Coarse Wave Division Multiplexing," Metrobility Optical Systems, Inc., 4 pages, (Copyright 2003).

(Continued)

*Primary Examiner* — Li Liu
(74) *Attorney, Agent, or Firm* — Merchant & Gould P.C.

(57) ABSTRACT

A WDM optical system includes first and second WDM's including an optical link therebetween. Each WDM includes circuitry for linking multiplexer and demultiplexer circuitry to a plurality of modular elements. The modular elements include a first set of modules for converting between native protocol media signals and common format signals. A second set of modules converts between the common format signals and optical signals at separate wavelengths for communication with the multiplexers and demultiplexers. A dual path transmit and receive optical link is provided between near and far end WDM's.

19 Claims, 5 Drawing Sheets

U.S. PATENT DOCUMENTS

| | | |
|---|---|---|
| 2004/0246989 A1 | 12/2004 | Brolin |
| 2005/0084262 A1 | 4/2005 | Oberg et al. |
| 2005/0084269 A1 | 4/2005 | Dallesasse et al. |
| 2007/0258715 A1* | 11/2007 | Androni et al. .................. 398/79 |

FOREIGN PATENT DOCUMENTS

| | | |
|---|---|---|
| EP | 0 667 690 A2 | 8/1995 |
| KR | 2003026507 A | 4/2003 |

OTHER PUBLICATIONS

"Multi-Rate Line Card—Enabling multiple services over a single fiber pair," Metrobility Optical Systems, Inc., 2 pages (Copyright 2004).

Evertz, *7705CWDM Block Diagrams and 7705CWDM Rear Panels*, 1 page (Publicly known at least as early as Mar. 1, 2004).

Force, Incorporated, *Application Note 136A—SPECTRALinx® DWDM/CWDM Modules & ITU Channels*, 6 pages (Apr. 2003).

Telecast Fiber Systems Inc., *Preliminary Data Sheet CWDM, Coarse Wavelength-Division Multiplexing for the Viper II*, 1 page, (© 2002).

Telecast Fiber Systems Inc., *Preliminary Product Information—MAMBA by Telecast*, 2 pages, (© 2004).

Torrey Pines Networks brochure, "Silverline™—CWD-400," 3 pages, (Sep. 3, 2002).

Tsunami® brochure, "8-Channel CWDM MUX or DEMUX," 2 pages, (2003).

* cited by examiner

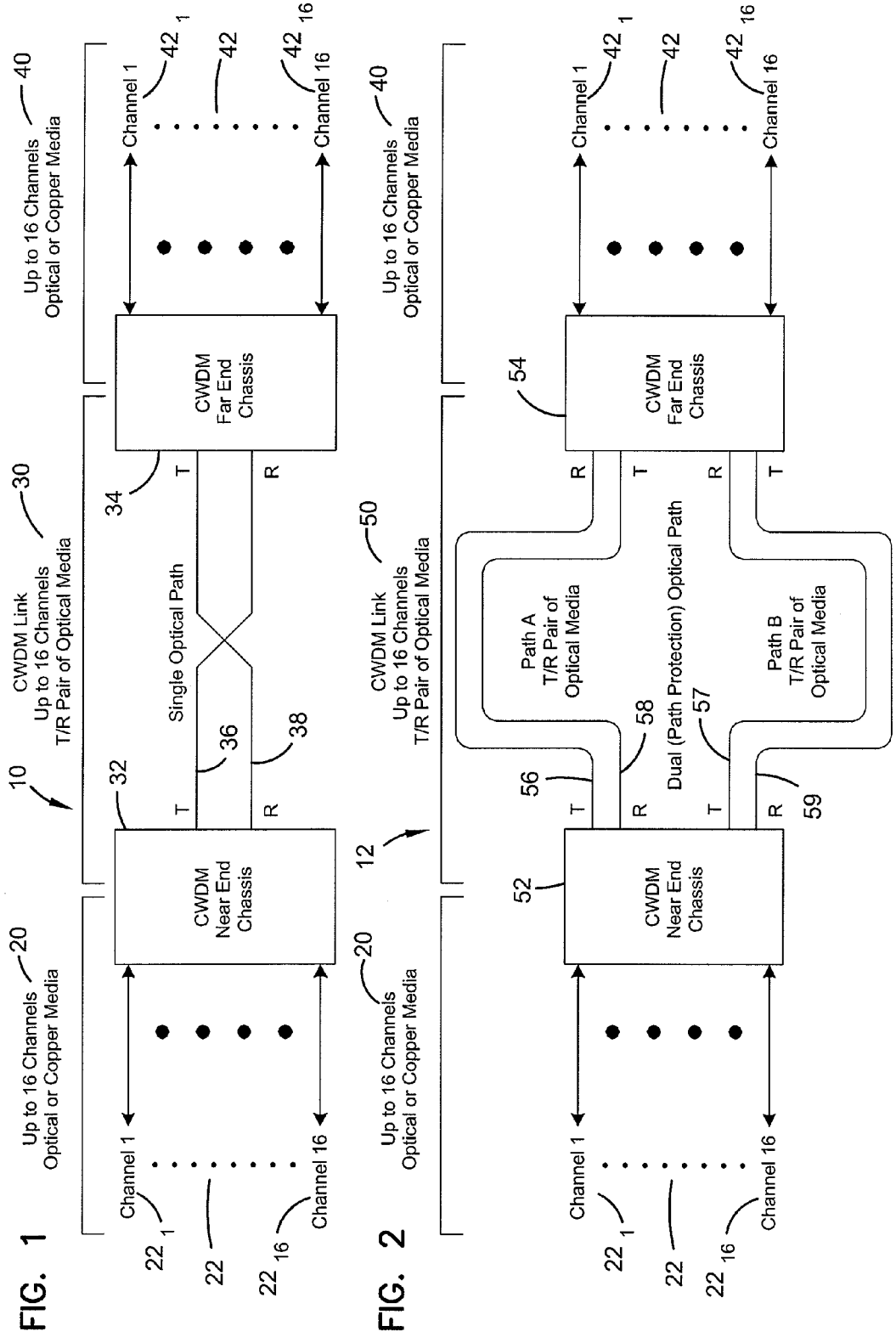

WDM SYSTEMS AND METHODS

CROSS REFERENCE TO RELATED APPLICATION

This application is a continuation of application Ser. No. 10/791,365, filed Mar. 1, 2004, which application is incorporated herein by reference in its entirety.

FIELD OF THE INVENTION

The present invention relates to wavelength division multiplexed optical networks.

BACKGROUND OF THE INVENTION

Wavelength division multiplexed (WDM) optical networks are known where light of multiple wavelengths is spacially dispersed such that each wavelength of light is spacially separated from every other wavelength of light. A plurality of signals having wavelengths of different lengths can be combined for transmission over a single fiber optic cable. For optical transmission systems such as in a backbone network with a great demand for communication, a further increase in capacity has been found by reducing the optical frequency spacing of a plurality of signal channels to increase the degree of multiplexing. WDM processing with a higher degree of multiplexing is called dense wavelength division multiplexing (DWDM). Also, it is known in optical transmission systems where there is not a large demand for communication, the degree of multiplexing can be decreased by increasing the optical frequency spacing of a plurality of signal channels. This has the effect of reducing costs for the system components. WDM processing with a lower degree of multiplexing is called coarse wavelength division multiplexing (CWDM). In a CWDM system, inexpensive optical components can be used.

In WDM systems, and in particular CWDM systems, a variety of different media signals may be handled including coaxial, twisted pair (shielded and unshielded), and optical. WDM's including CWDM's are utilized to process these signals for transmission over fiber networks. In the case of multimode signals on fiber optic cables, WDM's can be used to process the signals for transmission on a multiplexed single cable system including a single mode fiber.

There is a need for conversion circuitry associated with the WDM's to convert the native protocol media signal (coaxial, twisted pair, multimode optical), into an appropriate signal for multichannel transmission on a single fiber optic cable. There is a further need to modularize such system components. In particular, there is a need to modularize the components of the system to address concerns that arise during initial setup, and modifications and upkeep of the system over time.

SUMMARY OF THE INVENTION

The present invention concerns a WDM optical system and method including first and second WDM's including an optical link therebetween. Preferably, the optical link includes both a transmit signal path and a receive signal path. Each WDM includes circuitry for linking a multiplexer and demultiplexer to a plurality of modular elements. The modular elements include a first set of modules for converting between native protocol media signals and common format signals, and a second set of modules for converting between the common format signals and optical signals at separate wavelengths for communication with the multiplexers and demultiplexers.

In one preferred embodiment, a WDM chassis includes a backplane including an input power port, a control signal port, and a plurality of optical interface ports for interfacing with an optical to electrical conversion module or card. Each optical interface port includes a power port, a control signal port, and at least one optical port. Each optical to electrical card includes a backplane interface portion for mating with the power port, the control signal port, and the at least one optical port of the optical interface port of the backplane. The optical to electrical cards include optical to electrical conversion circuitry for converting between common format signals and optical signals. Each optical to electrical card includes an electrical interface port including a power port, a control signal port, and at least one electrical port. The electrical interface port interfaces with an electrical to electrical conversion module or card. Each electrical to electrical card includes electrical to electrical conversion circuitry for converting between native protocol media signals and common format signals. Each electrical to electrical card includes a media interface port including at least one main signal port.

The WDM chassis includes optical signal splitters for splitting or combining of the multiplexed output and input optical signals. The splitters provide dual pathway protection between near and far ends of the optical system.

BRIEF DESCRIPTION OF THE DRAWINGS

FIG. 1 is a schematic of a first preferred embodiment of a WDM optical system.

FIG. 2 is a schematic of a second preferred embodiment of a WDM optical system.

DETAILED DESCRIPTION OF THE PREFERRED EMBODIMENT

Figure 3:
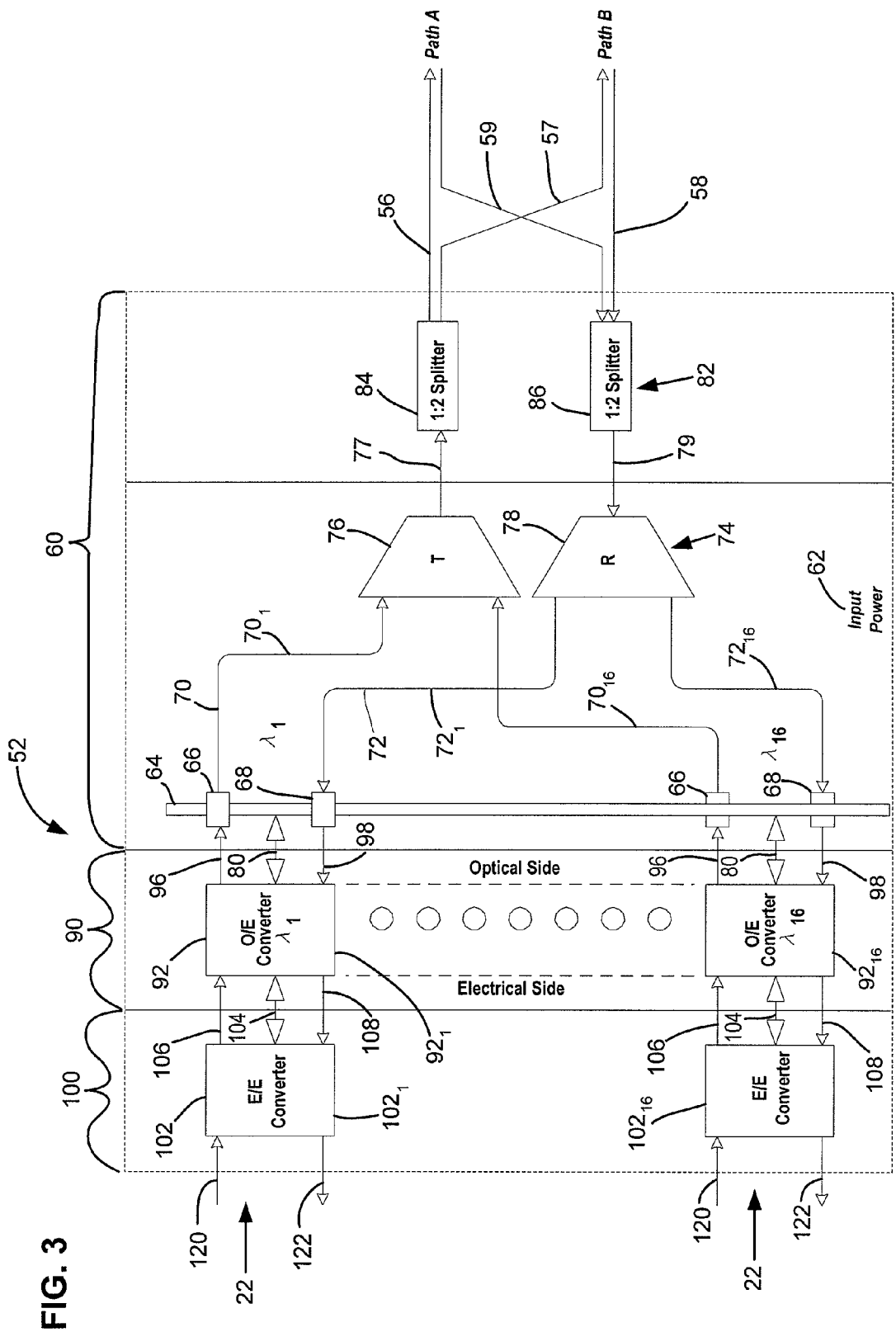
FIG. 3 is a schematic of a WDM chassis.

Referring now to FIG. 1, a first embodiment of a WDM system 10 is shown. A plurality of channels of native optical or copper media 20 are linked to a plurality of channels of native optical or copper media 40 across a multiplexed/demultiplexed optical link 30 over a single optical path. Near end individual channels 22 (represented by 16 different channels in the present embodiment, $22_1$ through $22_{16}$) communicate with far end channels 42 (represented by channels $42_1$ through $42_{16}$) over optical pathways 36, 38. As shown, pathways 36, 38 define transmit and receive signal pathways. Near and far end WDM's 32, 34 are used to multiplex/demultiplex the optical signals. As will be described below, WDM's 32, 34 include modular elements utilized during assembly and also useable at later points in time for further system modification or repair.

Referring now to FIG. 2, a modified WDM system 12 is shown including a multiplexed/demultiplexed optical link 50 with dual path protection. WDM's 52, 54 include splitting and combining functions which create dual pathways for communication between WDM's 52, 54. Such dual pathways are useful in case one pathway is disrupted, such as when one pathway is inadvertently severed in an underground placement. Generally, WDM's 52, 54 are similar to WDM's 32, 34, except WDM's 32, 34 do not include any splitting function.

Referring now to FIG. 3, WDM 52 includes circuitry for converting between native protocol media signals on channels 22 and the combined multiplexed optical signals on pathways 56, 57, 58, 59. WDM 52 includes multiplexing/demultiplexing circuitry 60, hereinafter referred to as mux/demux circuitry 60. Mux/demux circuitry 60 multiplexes the separate channels of optical signals into one signal for transmission to far end equipment. Mux/demux circuitry 60 also demultiplexes the one signal received from far end equipment into separate channels of optical signals. WDM 52 includes optical to electrical conversion circuitry 90 which interfaces with mux/demux circuitry 60. WDM 52 further includes electrical to electrical conversion circuitry 100 which interfaces with optical to electrical conversion circuitry 90. The conversion circuitry 90, 100 converts between native protocol media circuitry and the optical signals transmitted by mux/demux circuitry 60. WDM 54 includes similar features, allowing for two-way communication.

In the preferred embodiment, electrical to electrical conversion circuitry 100 is removably connectable to mux/demux circuitry 60. Further, in the preferred embodiment, optical to electrical conversion circuitry 90 is removably connectable to mux/demux circuitry 60. In addition, it is preferred that optical to electrical conversion circuitry 90 is removably connectable to electrical to electrical conversion circuitry 100. It is anticipated that a variety of different protocol media signals may be desired for handling by mux/demux circuitry 60. Appropriate conversion circuitry is selected for communicating between electrical to electrical conversion circuitry 100 and optical to electrical conversion circuitry 90, and also optical to electrical conversion circuitry 90 and mux/demux circuitry 60.

One result of the removable connections between components of WDM 52 is that a variety of native protocol media signals can be handled with a reduced number of components. In particular, the electrical to electrical conversion circuitry 100 can be selected for the native protocol media signals which are anticipated for WDM 52. The native protocol media signals can be converted into a common format signal such as NRZI digital format. An optical transceiver associated with optical to electrical conversion circuitry 90 uses the NRZI format signal to modulate a laser associated with each channel. Each laser associated with optical to electrical conversion circuitry 90 operates at a different wavelength. Receivers associated with the optical to electrical conversion circuitry 90 receive optical signals from mux/demux circuitry 60 and produce an NRZI format output signal which is transmitted to the electrical to electrical conversion circuitry 100.

By separating the optical to electrical conversion circuitry 90 from the electrical to electrical conversion circuitry 100, different grades of optical devices (i.e., data rates, launch power, and wavelength) can be employed as desired. Therefore, in low end applications like DS3, OC3, 10/100 M b/s Ethernet, lower cost components can be used.

Mux/demux circuitry 60 includes a power input port 62 which provides electrical power to a backplane 64. Backplane 64 can be constructed from a circuit board including appropriate circuit paths to link power from input power 62 to each O/E converter card 92. Backplane 64 includes optical couplers or interfaces 66, 68 (such as adapters) for each O/E converter card 92. Optical interfaces 66, 68 communicate through optical signal pathways 70, 72 to the multiplexer element 74 including multiplexer 76 or demultiplexer 78.

From multiplexer 76 and demultiplexer 78, one by two splitters 84, 86 are provided at splitter circuitry 82 for creating the dual optical pathways. Optical pathways 77, 79 link multiplexer 76, and demultiplexer 78 to the respective splitters 84, 86. Preferably, optical pathways 36, 38, 56, 57, 58, 59 are single mode optical pathways.

Each O/E converter module or card 92 includes an optical link 96, 98 (such as connectors) for linking to optical interfaces 66, 68 of backplane 64. An electrical interface 80 provides for an electrical link from backplane 64 to each O/E converter card 92, such as for any necessary power needed by each O/E converter card 92. Also, electrical interface 80 can link control signals handled by backplane 64 and communicated to each O/E converter card 92.

Each E/E converter module or card 102 includes an electrical link 106, 108 for communicating electrical signals with each O/E converter card 92 which are then converted into optical signals for transmission through mux/demux circuitry 60. Each E/E converter card 102 includes pathways 120, 122 for communicating native protocol media signals on channels 22. An electrical link 104 connects between each E/E converter card 102 and the mated O/E converter cards 92 for conveying any power needed by E/E converter cards 102, and for any control signals to be communicated to the E/E converter cards 102.

Figure 4:
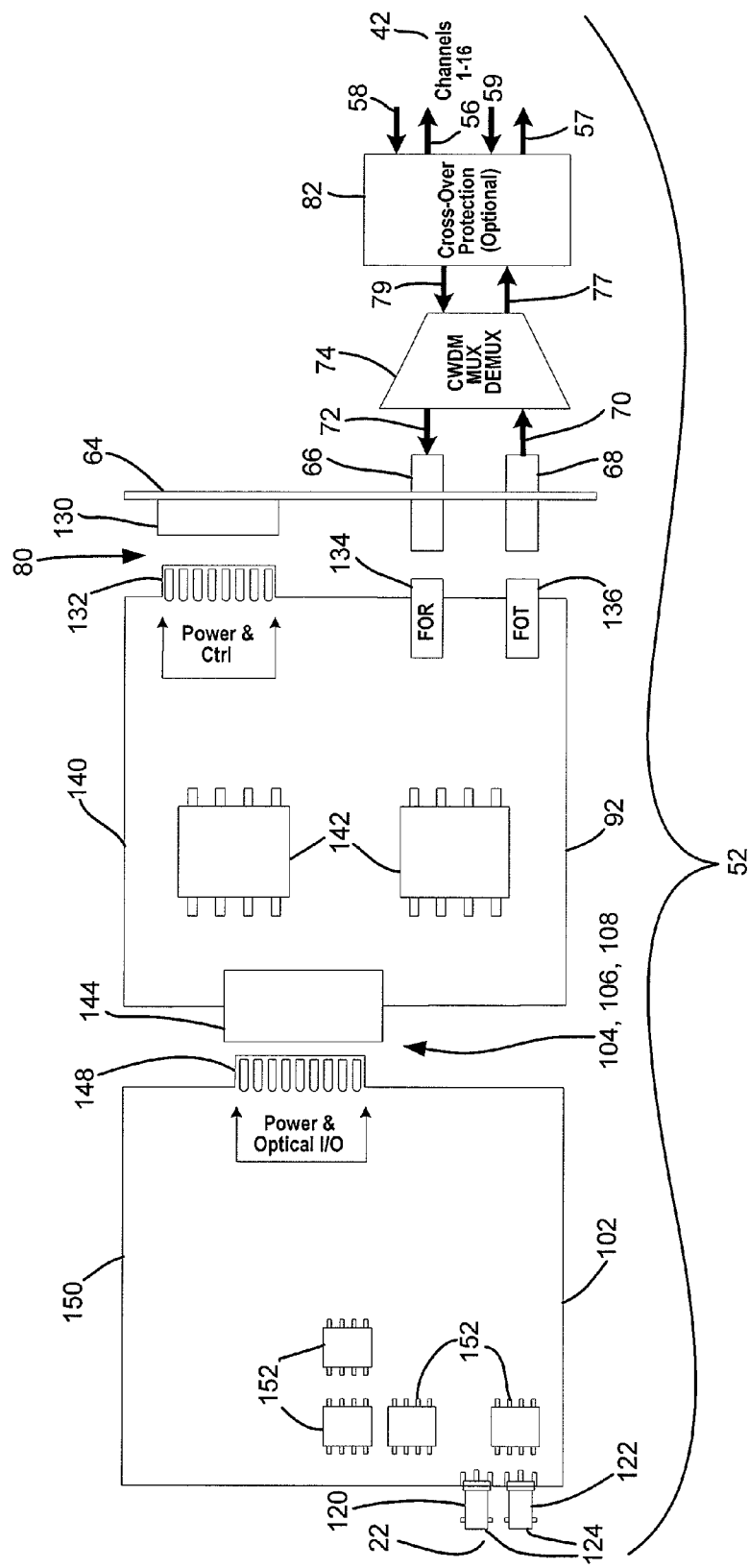
FIG. 4 is a more detailed schematic for aspects of the WDM chassis of FIG. 3.

Referring now to FIG. 4, backplane 64 is shown as including a card edge connector 130 which connects to an edge contact 132 of O/E converter card 92. Together card edge connector 130 and edge contact 132 form the electrical link 80 of FIG. 3. Fiber optic connectors 134, 136 connect to optical interfaces 66, 68 of back plane 64 wherein O/E converter card 92 is connectable and disconnectable with backplane 64, as desired. O/E converter card 92 includes a circuit board 140 including circuitry 142 for converting electrical signals from E/E converter card 102 into optical signals for transmission at fiber optic connectors 134, 136. For example, DFB lasers are used on O/E converter cards 92. Circuitry 142 of circuit board 140 further includes circuit pathways and elements for control and for converting any necessary power needed on O/E converter card 92 for signal conversion. Also, circuit pathways and elements are provided on circuit board 140 for linking edge contact 132 with card edge connector 144.

Card edge connector 144 on O/E converter card 92 links to E/E converter card 102 by connecting to an edge contact 148 on E/E converter card 102. E/E converter card 102 includes one or more connectors 124 for connecting to native protocol media signals. E/E converter card 102 includes a circuit board 150 including circuitry 152 for converting signals from the native protocol media format into the common format, such as NRZI, between connectors 124 and edge contact 148. In the present system, it is anticipated that native protocol media signals include coaxial and twisted pair (shielded and unshielded). Also, it is anticipated that native protocol media signals include optical signals, such as multimode. Circuitry 152 of circuit board 150 also includes circuit pathways and elements for power conversion for use in signal conversion between connectors 124 and edge contact 148. Also, circuit pathways and elements are provided on circuit board 150 for receipt and processing of control signals received from backplane 64.

Figure 5:
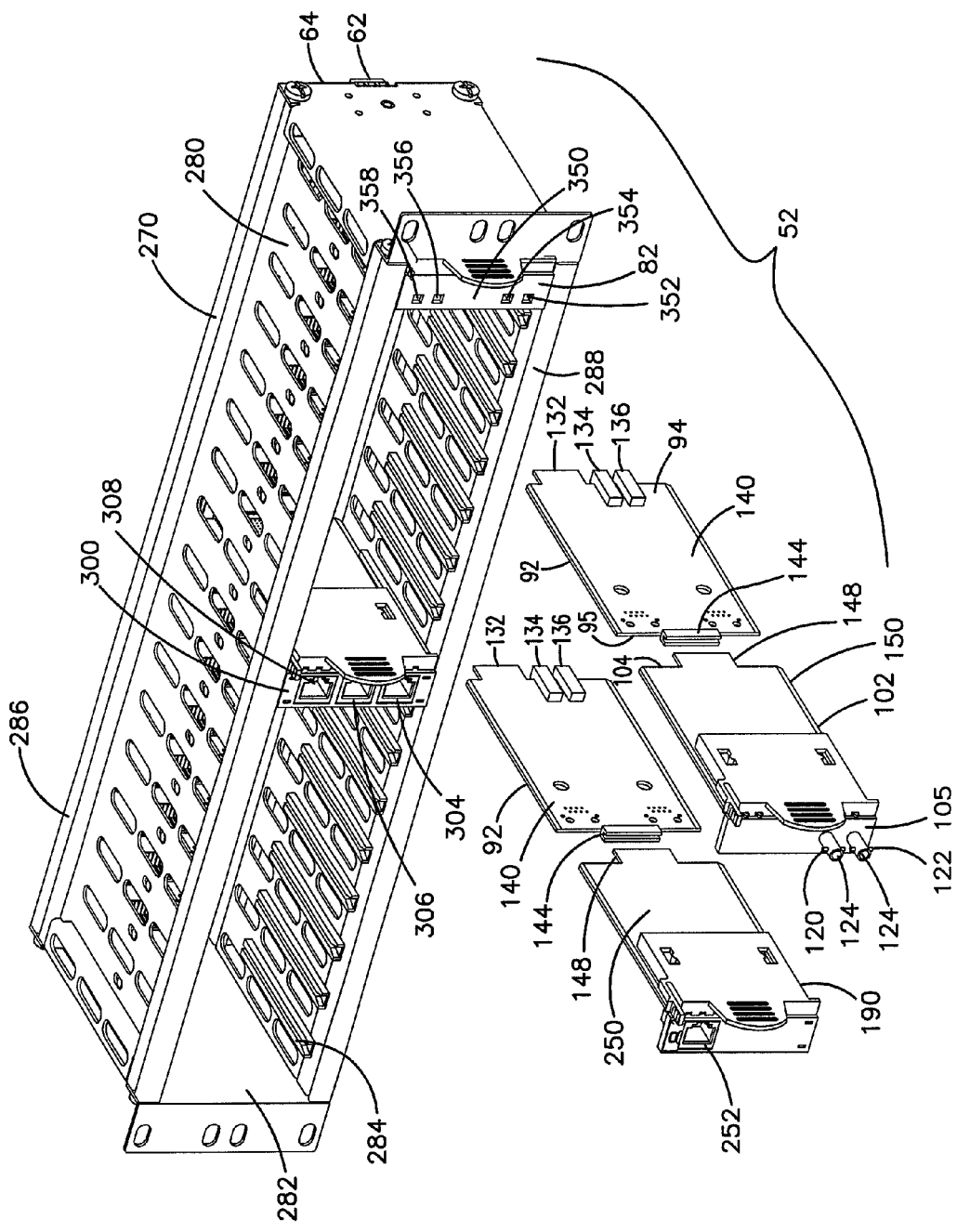
FIG. 5 is a more detailed perspective view of one embodiment of a WDM chassis including modular cards.

Referring now to FIG. 5, two optical to electrical converter cards 92 are shown removed from a chassis construction 270. Each converter card 92 operates at a different wavelength. Chassis construction 270 includes a housing 280 for holding the circuit cards and components of system 10. Housing 280 includes an open front 282 and internal guides 284 for guiding the circuit cards. Adjacent to a back 286 of chassis construction 270 is backplane 64. Chassis construction 270 can be rack mounted or mounted to other system cabinets or frames.

Both optical to electrical converter cards 92 slide into open front 282 of chassis construction 270. A rear end 94 of each optical to electrical converter card 92 includes edge contact 132 and fiber optic connectors 134, 136 for interfacing with perpendicularly arranged backplane 64. At a front end 95 of optical to electrical converter card 92, card edge connector 144 is positioned for interfacing with electrical to electrical converter card 102 arranged in a parallel manner. Adjacent to a back end 104 of E/E converter card 102 edge contact 148 is positioned for interfacing with card edge connector 144. At a front end 105 of E/E converter card 102 is positioned connectors 124. When both O/E converter card 92 and E/E converter card 102 are fully inserted into chassis construction 270, connectors 124 are presented along a front face 288 of chassis construction 270 and are linked with backplane 64 for signal transmission to other system components, including a far end WDM 54.

FIG. 5 illustrates a second embodiment of an E/E converter card 190 for use in handling signals of a different native protocol format. Connectors 124 of E/E converter card 102 are coaxial, such as for handling coaxial signals or HDTV signals. E/E converter card 190 includes a front port 252 for connecting to twisted pair cables. Specifically, port 252 is constructed as an RJ style jack. Circuitry on board 250 links port 252 with edge contact 148.

Chassis construction 270 further includes a CPU card 300 with ports 304, 306, 308 for connecting to other system components. CPU card 300 includes a rear interface (not shown on FIG. 5) similar to edge contact 148 for connecting to backplane 64, such as with a card edge connector, like card edge connector 130. CPU control signals are linked from CPU card 300 to each O/E converter card 92 and E/E converter card 102 through backplane 64. CPU card 300 sends command and control signals to each O/E converter card 92, and each E/E converter card 102. Also CPU card 300 can communicate with other system components including far end WDM's 54.

FIG. 5 also shows a splitter card 350 which shows four optical ports 352, 354, 356, 358. The optical ports provide for the dual path optical signal transmission to other system components, including a far end WDM 54. A rear of splitter card 350 includes optical connections to circuit paths 56, 57, 58, 59, noted above.

Figure 6:
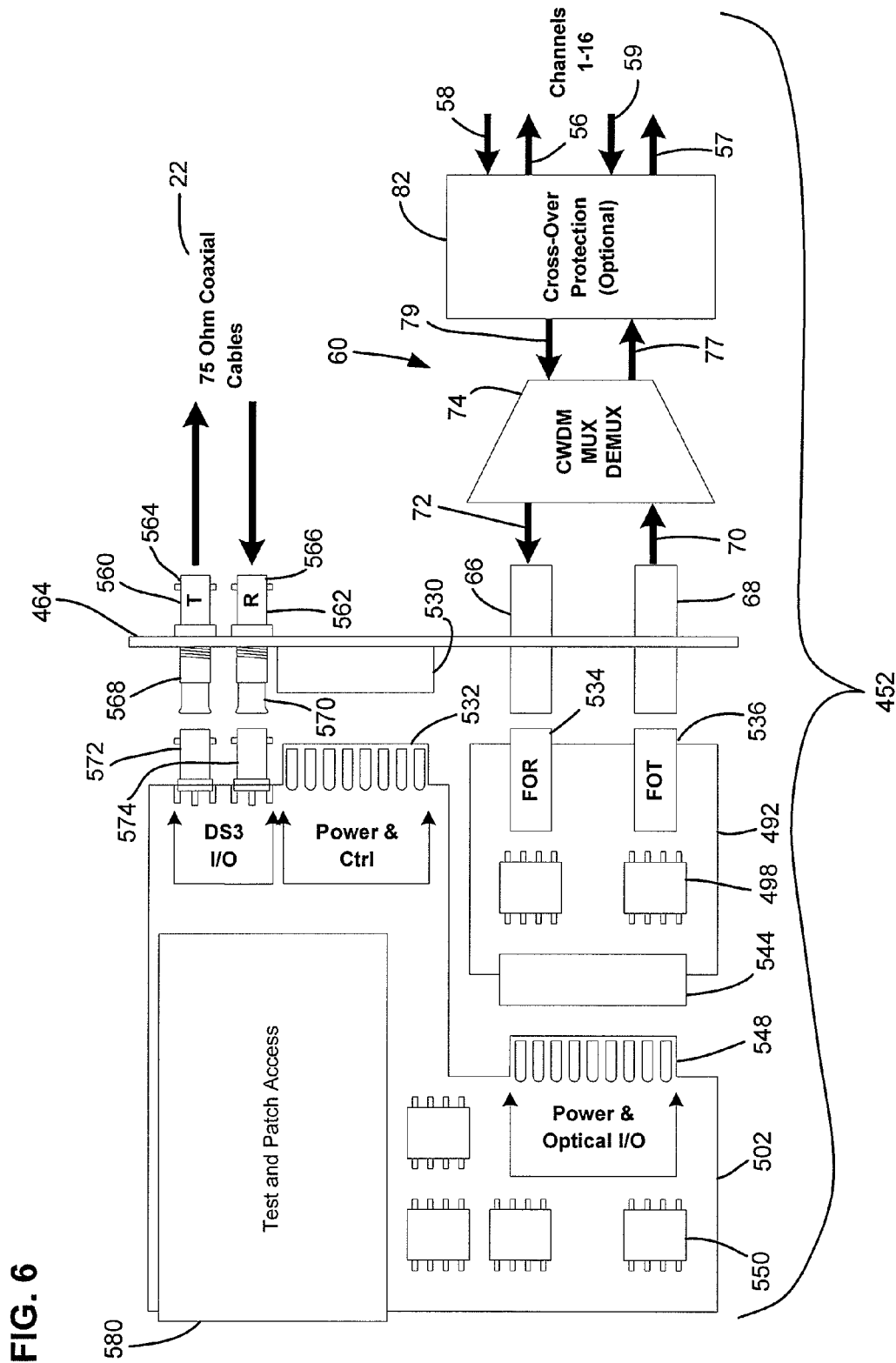
FIG. 6 is an alternative arrangement for the WDM chassis relative to the arrangement shown in FIG. 4.

Referring now to FIG. 6, an alternative arrangement for a WDM 452 is shown. A similar backplane 464 is provided as noted above for WDM 52 including a card edge connector 530 and optical interfaces 66, 68. Similar mux/demux circuitry 60 is provided for multiplexing and demultiplexing the optical signals for transmission to far end equipment. One difference with WDM 452 is that the input and output native protocol signals are through backplane 464, instead of adjacent to a front of WDM 452. E/E converter card 502 receives input signals and provides output signals for the native protocol format at native pathways 560, 562. Distal ends define connectors 564, 566 and are connected to cables, such as 75 ohm coaxial cables. Proximal ends 568, 570 define interface structure for mating with coaxial connectors 572, 574 of E/E converter card 502. Converter card 502 also communicates with backplane 464 through an edge contact 532 received in card edge connector 530. Any power needed for signal conversion on E/E converter card 502 is provided through edge contact 532. Also, all control signals can also be processed through edge contact 532. E/E converter card 502 includes circuitry 550 for converting native protocol media signals into common signal format, such as NRZI format. Also, circuitry 550 includes any necessary links between edge contact 532, and O/E converter card 492, such as for power or control. E/E converter card 502 includes an edge contact 548 for interfacing with the card edge connector 544 of O/E converter card 492. O/E converter card 498 includes conversion circuitry 498 for converting between common format signals and optical signals for communicating with mux/demux circuitry 60. Fiber optic connectors 534, 536 interface with optical interfaces 66, 68 to optically connect to mux/demux circuitry 60.

E/E converter card 502 includes access circuitry 580 for test or patch access to the native protocol media signals. Such test access may include a splitter function where a portion of the signal is tapped off, such for monitoring. In the case of patch access, switches can be included, such as switching jacks, for completely removing connectors 572, 574 from the circuit paths. In this manner, signals to or from card 502 can alternatively be to a second location, instead of through backplane 464.

The electrical interface 80 preferably includes an identification feature which will identify a code on O/E converter card 92 so that only an appropriate wavelength output will be accepted for each interface 80. For example, a bit position could be hardwired on to the card edge connection circuitry. In this manner, only the desired O/E converter card 92 with the desired wavelength for the overall system can be inserted and used. CPU card 300 can be employed to run queries of each card 92. With such a system, cards 92 at the wrong wavelength cannot be inserted into backplane 64 and used to cause system communication failures.

Preferably, power input port 62 is Telco power, and any different power needed by either O/E converter cards 92 or E/E converter cards 102 can be accomplished through isolated power converters on each of the cards.

While WDM 52 is shown as including 16 channels of signals (16 wavelengths), greater or fewer channels can be handled by appropriately selected conversion circuitry and mux/demux circuitry. In one preferred implementation, an 18 channel system can be provided wherein at least one channel is reserved for interconnecting local and remote CPUs for management and control. WDM's 52, 54 are considered CWDM's in the preferred embodiment. There would be a 20 nm optical separation between each laser. Systems with 2, 4, 8, 16, 20, and 48+ channels can be implemented with appropriate O/E cards 92.

Path protection is accomplished by using a one by two splitter on the output of the WDM mux/demux circuitry 60. A one by two splitter will typically reduce the power level on each output fiber by 50%. Preferably, each laser associated with the O/E converter cards has a sufficiently high optical launch power that allows this system to use splitters for path protection instead of optical switches. This has particular application for short haul applications.

With the above systems, a variety of native protocol media signal formats can be supported using an appropriately selected E/E converter card 102. Optical inputs can also be supported wherein the E/E converter card 102 converts the optical signal into an electrical signal, such as in the common format signal, wherein that signal is then converted back into an appropriate optical signal in the O/E converter card 92 for communication with the mux/demux circuitry 60. By splitting the converting functions between O/E cards and E/E cards, the number of line cards needed to populate a given chassis is reduced.

The E/E converter cards 102 and the O/E converter cards 92 can be added over time as systems grow. A chassis construction 270 can be sold partially populated, and then as system needs increase, additional cards can be added. Also, upgrades can be easily added with only replacing one of the O/E converter cards 92 or the E/E converter cards 102, depending on the upgraded elements. In the case of field replaceability, only that component needing replacement needs to be removed and replaced. The modular O/E convert cards allow for lower cost optics to be used for less demanding applications (i.e., less than 155 Mb/s).

Systems 10, 12 are protocol independent. E/E converter cards 102 are selected for the given native protocol. O/E converter cards 92 are provided with the desired laser and optical performance. Such systems are advantageous during manufacture and during maintenance and upkeep over time.

While preferred systems include both transmit and receive pathways, other systems may only need transmit or receive on each respective near and far end WDM's 52, 54. For example, one way video does not need both transmit and receive functions at each end. In this system, the corresponding multiplexer or demultiplexer components and pathways can be removed to further save cost.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A WDM optical system comprising:
    first and second WDM's;
    an optical link for transmit and receive signals for each WDM;
    each WDM including circuitry including a multiplexer and a demultiplexer;
    each WDM including a plurality of separate optical to electrical converters connecting to a backplane at an electrical interface, each optical to electrical converter removably mated with the circuitry wherein each optical to electrical converter includes optical to electrical conversion circuitry for converting between common format electrical signals and optical signals, the common format electrical signals having the same format for each of the plurality of separate optical to electrical cards;
    each WDM including a plurality of separate electrical to electrical converters, each electrical to electrical converter directly mated with one of the optical to electrical converters, each electrical to electrical converter including input and output signal locations and configured to provide conversion between native protocol media signals and the common format electrical signals;
    a CPU card connected to the backplane of the first WDM at a card edge connector, the CPU card configured to:
        send command and control signals to each optical to electrical converter and each electrical to electrical converter in the first WDM; and
        communicate with the second WDM.

2. The WDM optical system of claim 1, wherein the backplane of each of the first and second WDM's further includes an identification feature configured to allow identification of an optical to electrical converter card operable at a desired wavelength.

3. The WDM optical system of claim 1, wherein each of the plurality of electrical to electrical cards includes a rear interface portion including a card edge connector for removably mating directly with an electrical interface port of an optical to electrical converter.

4. The WDM optical system of claim 1, wherein each of the electrical to electrical converters connects to the backplane.

5. The WDM optical system of claim 1, further comprising a splitter card inserted into a including a plurality of optical ports, the splitter card configured to provide dual path optical signal transmission to the second WDM.

6. A WDM chassis comprising:
    a backplane including an input power port, a control signal port, and a plurality of optical interface ports for interfacing with an optical to electrical conversion card, each optical interface port including a power port, a control signal port, and at least one optical port;
    a plurality of optical to electrical cards each including a backplane interface portion for mating with the optical interface port and including a power port, a control signal port, and at least one optical port, each optical to electrical card including optical to electrical conversion circuitry for converting between common format signals and optical signals, each optical to electrical card including an electrical interface port including a power port, a control signal port, and at least one electrical port;
    a plurality of electrical to electrical cards each including a rear interface portion mating with the electrical interface port and including a power port, a control signal port, and at least one electrical port, each electrical to electrical card including electrical to electrical conversion circuitry for converting between native protocol media signals and common format signals, each electrical to electrical card including a media interface port including at least one main signal port;
    a CPU card connected to the backplane at a card edge connector, the CPU card configured to:
        send command and control signals to each optical to electrical card and each electrical to electrical card; and
        communicate with a WDM system remote from the WDM chassis.

7. The WDM chassis of claim 6, wherein the backplane further includes an identification feature configured to allow identification of an optical to electrical converter card operable at a desired wavelength.

8. The WDM chassis of claim 6, wherein the common format signals have the same format for each of the plurality of separate optical to electrical converter cards.

9. The WDM chassis of claim 6, wherein the rear interface portion of each electrical to electrical card includes a card edge connector useable to directly and removably mate with the electrical interface port of an optical to electrical card.

10. The WDM chassis of claim 6, wherein at least one of the electrical to electrical cards provides test access to the native protocol media signals.

11. The WDM chassis of claim 6, wherein at least one of the electrical to electrical cards directly connects to the backplane.

12. The WDM chassis of claim 6, wherein the common format signals comprise NZRI formatted signals.

13. A method of optical system management comprising:
    providing multiplexing and demultiplexing circuitry for a multi-channel signal system;
    mating a plurality of optical to electrical converter cards to the circuitry via a backplane, each optical to electrical converter card selected to transmit and receive optical signals at a distinct wavelength of light relative to the other optical to electrical converter cards of the multichannel system, each of the plurality of optical to electrical converter cards configured to receive electrical signals from an electrical to electrical conversion card in a common electrical format, the common electrical format being the same format for each of the plurality of separate optical to electrical cards;

mating an electrical to electrical converter card directly to a selected one of the optical to electrical converter cards, wherein the electrical to electrical converter card transmits and receives native protocol media signals in a first electrical format, and converts the signals to the common electrical format, wherein the signals of the common electrical format are converted to optical signals at the distinct wavelength of light of the selected optical to electrical converter card; and mating a CPU card to the backplane, the CPU card configured to send command and control signals to each optical to electrical converter card and to the electrical to electrical converter card and communicate with a far-end WDM.

14. The method of claim 13, wherein the electrical to electrical converter card transmits and receives a signal selected from the group consisting of:

a twisted pair native protocol media signal;
a coaxial native protocol media signal; and
an optical native protocol media signal.

15. The method of claim 13, further comprising connecting test access circuitry to receive a monitor signal using the electrical to electrical converter card.

16. The method of claim 13, wherein mating an electrical to electrical converter card to a selected one of the optical to electrical converter cards includes connecting the electrical to electrical converter card to the selected one of the optical to electrical converter cards at a card edge connection.

17. The method of claim 13, further comprising running one or more queries of each optical to electrical converter card from the CPU card.

18. The method of claim 13, wherein mating a plurality of optical to electrical converter cards to the circuitry comprises mating the plurality of optical to electrical cards to each of a plurality of locations on the backplane.

19. The method of claim 13, further comprising mating a splitter card to the backplane, the splitter card configured to provide dual path optical signal transmission to the second WDM.

* * * * *